United States Patent Office 3,317,629
Patented May 2, 1967

---

3,317,629
EXTENDERS FOR OLEOPHOBIC FLUOROALKYLSILOXANES
George J. Quaal, Midland, Mich., assignor to Dow Corning Corporation, Midland, Mich., a corporation of Michigan
No Drawing. Filed Sept. 11, 1964, Ser. No. 395,931
23 Claims. (Cl. 260—827)

ABSTRACT OF THE DISCLOSURE

Heat curable compositions for making fabrics oleophobic and hydrophobic comprising a hydrolyzate of

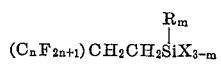

X being a hydrolyzable group, n has an average value of at least 4, and m has an average value of 0 to 1, extended with an alkyl acrylate or methacrylate, and a curing catalyst.

---

This application relates to oleophobic compositions which contain fluoroalkylpolysiloxanes.

Fluoroalkylpolysiloxanes, e.g. polymers of the unit formula

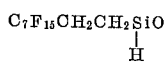

are useful materials for making fabrics oleophobic. U.S. Patent 3,012,006, for example, teaches how to make oleophobic fabrics by this technique.

It has been found that when certain acrylic polymers are added to these fluoroalkylpolysiloxanes, materials are formed which impart excellent oleophobicity to fabrics at a fraction of the cost of an equivalent amount of pure fluoroalkylpolysiloxane. No greater amount of the acrylic-containing compositions of this invention need be used on a fabric in order to obtain comparable or superior oleophobicity to fabrics treated with undiluted fluoroalkylpolysiloxane.

The effect, therefore, is that inexpensive polyacrylates behave, in the compositions of this invention, in the manner of expensive fluoroalkylpolysiloxanes.

An object of this invention is to provide a means for making oleophobic, hydrophobic fabrics which are more competitive through lower cost.

Another object is to provide compositions which impart improved oleophobicity and hydrophobicity to fabrics.

This invention relates to a heat-curable composition comprising (a) from 10 to 80 parts by weight of the hydrolyzate of

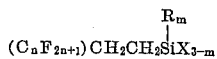

(b) from 20 to 90 parts by weight of a polymeric composition having a unit formula

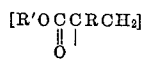

there being a total of 100 parts of (a) and (b) present, and (c) a catalytic amount of a curing catalyst for (a), where R is selected from the group consisting of hydrogen and lower alkyl radicals, X is a hydrolyzable group, n has an average value of at least 4, m has an average value of 0 to 1, and R' is an alkyl radical.

R can be hydrogen or any lower alkyl radical such as the methyl, ethyl, or isopropyl radicals. R' can be any alkyl radical such as the methyl, ethyl, butyl, isohexyl, dodecyl, or stearyl radicals.

X can be any hydrolyzable group, e.g. any halogen such as Cl or Br; any acyloxy group such as the acetate, propionate, or butyrate groups; any alkoxy group such as the methoxy, ethoxy, isopropoxy, or butoxy groups; any alkylalkoxy group such as the beta-ethoxyethoxy or the methoxymethoxy ($CH_3OCH_2O$—) group; any alkyl-substituted isocyanoxy group such as

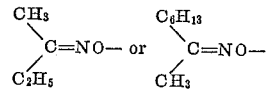

or the isocyanate group.

The hydrolyzate which is ingredient (a) is of indefinite formula. It is known, however, that the great majority of hydrolyzable groups in the unhydrolyzed composition are replaced with hydroxyl groups during the hydrolysis process. Furthermore, many of these new silicon-bonded hydroxyl groups condense with each other, or with unreacted hydrolyzable groups to form siloxane (SiOSi) linkages.

The hydrolyzate is, therefore, a siloxane which contains hydroxyl groups, and also may contain residual silicon-bonded hydrolyzable groups.

The hydrolysis process is well-known, performed by adding water to the fluoroalkylhalosilanes, or by adding water and an acid or alkaline catalyst to the fluoroalkylsilanes having hydrolyzable groups other than halogen. The preferred hydrolyzable groups are the chlorine atom, the lower alkoxy groups, the acetoxy group, or the lower alkylalkoxy groups.

It is further preferred for ingredient (a) to be of sufficiently low molecular weight that it is soluble in solvents such as methylisobutylketone.

Likewise, it is preferred for m to be 0 and for n to be from 4 to 17.

Ingredient (b) is a polymeric acrylate as shown in the above formula, the production of which is well-known to the art. It is preferred for the molecular weight of ingredient (b) to be such that the material is a rigid or rubbery solid at room temperature.

Ingredient (c) can be any of a large number of catalysts, all of which are known to the art. Among the effective catalysts are the organic acid salts of divalent tin, cadmium, cobalt, magnesium, nickel, iron, zinc, lead, and the ZrO radical, where the organic acid radicals contain from 3 to 12 carbon atoms, e.g. the propionate, butyrate, octoate, and laurate radicals.

The large majority of known condensation catalysts are operative in this invention, it being required that an operative catalyst be able to condense ingredient (a).

Further examples are the titanium esters such as tetraisopropyltitanate, the zirconium esters such as tetraoctylzirconate, titanium complexes such as triethanolamine titanate, organic amines such as triethanolamine, triethylamine, butylamine, and dipropylamine; and hydrolyzable silicone-amines such as

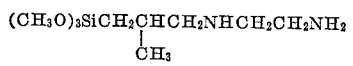

$(CH_3O)_3SiCH_2CH_2CH_2NHCH_2CH_2NH_2$

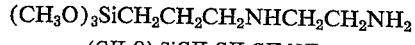

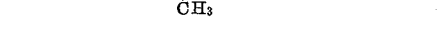

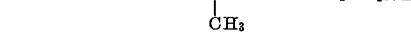

and their hydrolyzates.

The hydrolyzable silicone amines are preferred catalysts. Particularly preferred catalysts for this invention have the formula:

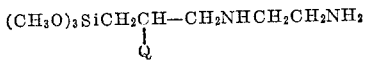

where Q is a hydrogen or methyl radical. It is preferred to use these catalysts in proportions of 1 to 41 weight percent, based on the weight of ingredients (a) and (b).

It has further been found that when $n$ has a value of 4 to 5, ingredient (b) can be present in a maximum amount of 98 parts by weight to 2 parts of ingredient (a). When $n$ is greater than 5, ingredient (b) can only be present in a maximum amount of 90 parts of ingredient (b) to 10 parts of ingredient (a).

The minimum amount of ingredient (b) that can be present is 20 parts out of 100, the remainder being ingredient (a). This is not a functional limitation; fabrics can be made olephobic with mixtures containing less than 20 percent of ingredient (b), but an advantage of this invention is to extend and dilute the expensive fluorosilicone ingredient without ill effect to the properties of the mixture. Therefore, an arbitrary limit is placed on the minimum amount of ingredient (b) in order to emphasize the advantage of this invention.

The composition of this invention requires no known chemical combination of the ingredients to be operative. One suitable method for preparing the composition for use is to dissolve ingredients (a), (b), and (c) in a solvent, e.g. methylisobutyl ketone. The fabric which is to be treated is then dipped in the solution and allowed to dry. The fabric should pick up at least one weight percent of solute from the solution, based on the weight of the fabric, and it is preferred for 1.5 to 2 percent of solute to be taken up by the fabric.

Alternatively, an emulsion of the three ingredients can be used to apply the composition to the fabric. After dipping the fabric, the fluid carrier of the emulsion can be removed by evaporation.

As a third method of application, the composition of this invention with an unhydrolyzed ingredient (a) can be placed on the fabric, the hydrolysis then taking place on the fabric, optionally as part of the curing process. The methoxy group is the preferred hydrolyzable group for this particular method of application.

After application of the composition of this invention to the fabric, the coated fabric is cured by heating. The operative time and temperature of heating varies with the type of the catalyst, the type and degree of condensation of ingredient (a), the type and molecular weight of ingredient (b), and is not critical as long as curing is attained. Generally, temperatures in excess of 250° F. and heating times of over 2 minutes should be used. It is preferred for a temperature of 300 to 350° F. and a heating time of 3 to 4 minutes to be used.

It is after the heating step that the fabric becomes oleophobic.

Any fabric is suitable for use in this invention. Examples of suitable fabrics, are those made from wool, cotton, glass, Dacron, Acrilan, Arnel, Viscose, Cellulose Acetate, Rayon, and Nylon.

The following examples are illustrative only and should not be construed as limiting the invention which is properly set forth in the appended claims.

*Example 1*

In 53 ml. of methylisobutylketone, there was dissolved 1–2 mls. of trichlorotrifluoroethane, 0.3 g. of a hydrolyzate of

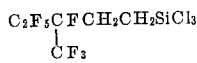

which was sufficiently uncondensed to be still soluble in the above solvent, 1.2 g. of Lucite 45, a polymer consisting essentially of methylmethacrylate units, and 0.15 g. of

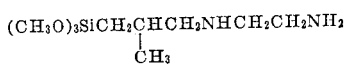

catalyst.

(a) Squares of brown wool felt and of 80 x 80 cotton percale were immersed in the solution, allowed to drip-dry, and cured for 3 minutes at 300° F. The solids pickup for each fabric was 1.5 to 2 weight percent, based on the weight of the fabric.

(b) Squares of the same fabrics were immersed in a pure hydrolyzate of 1.5 g. of

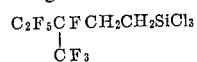

which contained 0.6 g. of the above catalyst, and the squares were then dried and cured for 3 minutes at 300° F. The solids pickup was from 1.5 to 2 weight percent, based on the weight of the fabric.

The fabrics were subjected to the following tests:

*Oil test.*—One drop of USP heavy mineral oil was placed on the fabric. If the fabric was wet in three minutes, a rating of 0 was awarded. If not, one drop of a mixture by volume of 90% mineral oil and 10% heptane was placed on the fabric. If the fabric was wet from that drop in 3 minutes, a rating of 50 was awarded. If not, a drop of a mixture by volume of 80% mineral oil and 20% heptane was placed on the fabric. If wetting occurred from this drop in three minutes, a rating of 60 was awarded. If not, a drop of a mixture by volume of 70% mineral oil and 30% heptane was added, etc.

It can therefore be seen that a rating of 100 means that the fabric will not be wet in three minutes when a drop containing equal parts by volume of mineral oil and heptane is used.

*Spray test.*—A square of fabric is placed at a 45° angle to the horizontal, and 250 mls. of water is sprinkled on it from a height of about 8 inches.

The square is tapped lightly four times to remove non-adhering water, and is examined. The following ratings are awarded:

0—Water has penetrated through the fabric in at least one place.
50—The top side of the fabric is wet; the bottom dry.
70—Spots of moisture are present on the top side of the fabric.
80—Pinpoints of moisture are present on the top side of the fabric.
90—A trace of moisture is present on the fabric.
100—No moisture is present on the fabric.

The results of the above tests on the fabrics of this example are shown below:

| | Brown wool felt, Oil test | Cotton percale | |
|---|---|---|---|
| | | Oil test | Spray test |
| Fabric squares (a) containing fluoroalkylpolysiloxane plus extender | 100 | 100 | 70 |
| Fabric squares (b) containing a similar weight of pure fluoroalkylpolysiloxane | 80 | 80 | 50/70 |

*Example 2*

In several flasks, solutions were made from 74 ml. of methylisobutylketone, 0.015 g. of

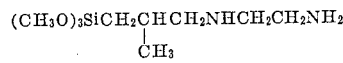

catalyst, 0.3 g. of a hydrolyzate of

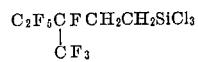

and 1.2 g. of a polyacrylate (as shown below).

In addition to this, an identical solution was made as a control, where an identical weight of the fluoroalkylpolysiloxane hydrolyzate was substituted for the polyacrylate.

Squares of brown wool felt and 80 x 80 cotton percale were padded in these solutions, air-dried, and cured for 3 minutes at 300° F.

The fabric squares were tested according to Example 1. The polyacrylates used and the results thereof are shown below:

| Polyacrylate Used | Brown wool felt | | Cotton percale | |
|---|---|---|---|---|
| | Oil test | Spray test | Oil test | Spray test |
| Polybutylmethacrylate | 70 | 80 | 70 | 70 |
| Polylaurylmethacrylate | 70 | 70 | 60 | 70+ |
| Polystearylmethacrylate | 90 | 70/80 | 70 | 80 |
| Polyethylacrylate | 80+ | 70 | 80− | 70 |
| Control: fluorosilicone replaces acrylate | 70 | 80+ | 70 | 80+ |

*Example 3*

To 5 flasks, each containing 35 ml. of methylisobutyl ketone and about 1 ml. of trichlorotrifluoroethane there was added the amounts of

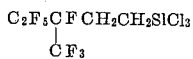

hydrolyzate, polystearylmethacrylate, and

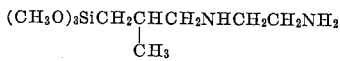

catalyst that are shown below.

Brown wool felt squares were padded in these solutions, were air dried, and were cured for 3 minutes at 300° F. They were tested in accordance with Example 1.

The ratio of ingredients and the test results are shown below:

| Wt. percent fluorosiloxane in solids | Grams of fluorosiloxane | Grams of acrylate | Grams of catalyst | Oil test | Spray test |
|---|---|---|---|---|---|
| 2 | 0.015 | 0.74 | 0.005 | 80− | 70 |
| 5 | 0.038 | 0.71 | 0.010 | 80 | 70 |
| 10 | 0.075 | 0.68 | 0.025 | 80 | 70 |
| 15 | 0.113 | 0.63 | 0.035 | 90 | 70 |
| 20 | 0.150 | 0.60 | 0.050 | 80 | 70 |

*Example 4*

Squares of 80 x 80 cotton percale and of brown wool fabric were immersed in methylisobutylketone solutions containing $C_7F_{15}CH_2CH_2SiCl_3$ hydrolyzate, polystearylmethacrylate, and

catalyst in the percentages shown below. The solids content of all the solutions was constant.

The fabric squares were air-dried and cured for 3 minutes at 300° F. The solids pickup on the fabric was 1.5 to 2%, based on the fabric weight. They were tested in accordance with Example 1.

The ratio of the ingredients and the test results are shown below:

| (a) Wt. percent fluoro-silicone, based on (a)+(b) | (b) Wt. percent acrylate, based on (a)+(b) | (c) Wt. percent catalyst, based on (a)+(b)+(c) | Cotton | | Wool | |
|---|---|---|---|---|---|---|
| | | | Oil test | Spray test | Oil test | Spray test |
| 2 | 98 | 0.4 | 0 | 70 | 0 | 70 |
| 5 | 95 | 1.0 | 0 | 80 | 0 | 70 |
| 10 | 90 | 2.0 | 0 | 80 | 60 | 70 |
| 20 | 80 | 4.0 | 90 | 80+ | 100 | 80− |
| 50 | 50 | 9.0 | 100 | 90 | 100 | 80 |
| 100 | 0 | 16.6 | 100 | 90 | 100 | 80 |

*Example 5*

The experiment of Example 1(a) was repeated, substituting polyvinylacetate for Lucite 45 in the treating solution.

The cured brown wool felt square treated in this experiment received a 0 in the oil test. The cured cotton percale squares of this experiment received a 0 in the oil test and 50/70 in the spray test.

*Example 6*

Various fabrics were treated with a methylisobutyl ketone solution containing 9 weight percent of

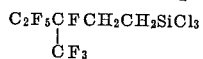

hydrolyzate, 82 weight percent of Lucite 45, a polymer consisting essentially of methylmethacrylate units, and 9 weight percent of

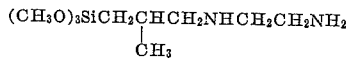

based on the total weight of the solute.

Each treated fabric picked up between 1.5 and 2 weight percent of solids, measured after the fabric was dried and based on the fabric weight.

Each fabric was submitted to the oil test of Example 1. The results are tabulated below.

Fabric: Oil Test
Brown wool _____ 80
Brown gabardine _____ 80
80 x 80 cotton percale _____ 70
Glass _____ 70
Dacron _____ 80+
Acrilan _____ 90
Arnel _____ 100
Viscose _____ 80
Cellulose acetate _____ 90−
Nylon _____ 90−

*Example 7*

When solutions (or emulsions) of the following compositions are applied to wool fabric, an oleophobic fabric is obtained on curing by heating:

(a)

5 parts

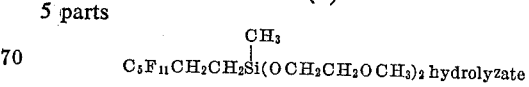

5 parts polybutylacrylate
1 part tetrabutyltitanate
100 parts diethylether
Heat 4 minutes at 300° F.

(b)

6 parts $C_{20}F_{41}CH_2CH_2Si[ON=C(CH_3)_2]_3$ hydrolyzate
4 parts polydecylethacrylate
2 parts stannous octoate
200 parts tetrahydrofuran
Heat 3 minutes at 400° F.

(c)

1 part $C_{10}F_{21}CH_2CH_2\underset{\underset{CH_3}{|}}{Si}(OCH_3)_2$ hydrolyzate 2 parts polypropylproacrylate
1 part triethanolamine
50 parts cyclohexanone
Heat 5 minutes at 250° F.

(d)

1 part $C_{17}F_{35}CH_2CH_2Si(O\underset{\underset{O}{\|}}{C}CH_3)_3$ hydrolyzate 3 parts polyethylmethacrylate
1 part dipropylamine
25 parts water to form an emulsion rather than a solution.
Heat 4 minutes at 300° F.

(e)

1 part $C_8F_{17}CH_2CH_2Si(OC_2H_5)_3$
0.5 part magnesium laurate
5 parts of a copolymer containing equimolar amounts of polysterylacrylate and polymethylmethacrylate units
100 parts dipropyl ether.
Heat 5 minutes at 300° C.

That which is claimed is:

1. A heat-curable composition comprising
   (a) from 10 to 80 parts by weight of the hydrolyzate of $$(C_nF_{2n+1})CH_2CH_2\underset{\underset{R_m}{|}}{Si}X_{3-m}$$

(b) from 20 to 90 parts by weight of a polymeric composition having a unit formula of $$[R'O\underset{\underset{O}{\|}}{C}\underset{\underset{|}{R}}{C}CH_2-]$$

there being a total of 100 parts of (a) and (b) present, and
   (c) a catalytic amount of a curing catalyst for (a), where R is selected from the group consisting of hydrogen and lower alkyl radicals, X is a hydrolyzable group, $n$ has an average value of at least 4, $m$ has an average value of 0 to 1, and R' is an alkyl radical.

2. A heat-curable composition comprising
   (a) from 2 to 80 parts by weight of the hydrolyzate of $$(C_nF_{2n+1})CH_2CH_2\underset{\underset{R_m}{|}}{Si}X_{3-m}$$

(b) from 20 to 98 parts by weight of a solid, polymeric composition having a unit formula of $$[R'O\underset{\underset{O}{\|}}{C}\underset{\underset{|}{R}}{C}CH_2-]$$

there being a total of 100 parts of (a) and (b) present, and
   (c) a catalytic amount of curing catlyst for (a), where R is selected from the group consisting of hydrogen and lower alkyl radicals, X is a hydrolyzable group, $n$ has an average value of 4 to 5, $m$ has an average value of 0 to 1, and R' is an alkyl radical.

3. The composition of claim 1 where (a) is the hydrolyzate of $C_{17}F_{35}CH_2CH_2SiX_3$, X being a hydrolyzable group.

4. The composition of claim 1 where (a) is the hydrolyzate of $C_7F_{15}CH_2CH_2SiX_3$, X being a hydrolyzable group.

5. The composition of claim 2 where (a) is the hydrolyzate of $C_4F_9CH_2CH_2SiX_3$, X being a hydrolyzable group.

6. The composition of claim 1 where (b) is essentially polymethylmethacrylate.

7. The composition of claim 2 where (b) is essentially polymethylmethacrylate.

8. The composition of claim 1 where (b) is essentially polystearylmethacrylate.

9. The composition of claim 2 where (b) is essentially polystearylmethacrylate.

10. The composition of claim 1 where (b) is essentially polyethylacrylate.

11. The composition of claim 2 where (b) is essentially polyethylacrylate.

12. The composition of claim 1 where the curing catalyst is a hydrolyzable silicone amine.

13. The composition of claim 2 where the curing catalyst is a hydrolyzable silicone amine.

14. The composition of claim 1 where from 1.0 to 41 weight percent, based on the weight of (a) and (b), of $$(CH_3O)_3SiCH_2\underset{\underset{Q}{|}}{C}HCH_2\underset{\underset{H}{|}}{N}CH_2CH_2NH_2$$

is used as the curing catalyst, where Q is selected from the group consisting of hydrogen and the methyl radical.

15. The composition of claim 2 where from 1.0 to 41 weight percent, based on the weight of (a) and (b), of $$(CH_3O)_3SiCH_2\underset{\underset{Q}{|}}{C}HCH_2\underset{\underset{H}{|}}{N}CH_2CH_2NH_2$$

is used as the curing catalyst, where Q is selected from the group consisting of hydrogen and the methyl radical.

16. The process of applying the composition of claim 1 to a fabric, and curing the resulting coated fabric, at least 1 weight percent of said composition, based on the fabric weight, being picked up by the fabric, whereby an oleophobic, hydrophobic fabric is produced.

17. The process of claim 16 where a solution of the composition is applied to the fabric, the solvent is removed, and the resulting coated fabric is cured, at least 1 weight percent of said composition being picked up by the fabric, based on the fabric weight; whereby an oleophobic, hydrophobic fabric is produced.

18. The process of applying the composition of claim 2 to a fabric, and curing the resulting coated fabric, at least 1 weight percent of said composition, based on the fabric weight, being picked up by the fabric; whereby an oleophobic, hydrophobic fabric is produced.

19. The process of claim 18 where a solution of the composition is applied to the fabric, the solvent is removed, and the resulting coated fabric is cured, at least 1 weight percent of said composition being picked up by the fabric, based on the fabric weight; whereby an oleophobic, hydrophobic fabric is produced.

20. The oleophobic, hydrophobic fabric produced by the process of claim 16.

21. The oleophobic, hydrophobic fabric produced by the process of claim 17.

22. The oleophobic, hydrophobic fabric produced by the process of claim 18.

23. The oleophobic, hydrophobic fabric produced by the process of claim 19.

No references cited.

SAMUEL H. BLECH, *Primary Examiner.*